June 24, 1947. H. M. GRIFFOUL 2,423,018
ROTARY DRUM FURNACE
Filed Oct. 14, 1942 5 Sheets-Sheet 5
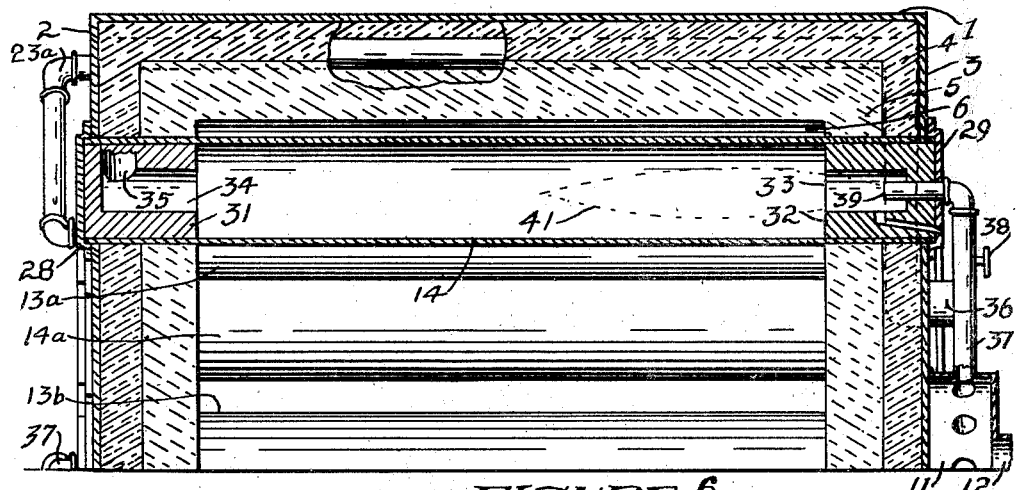
FIGURE 6
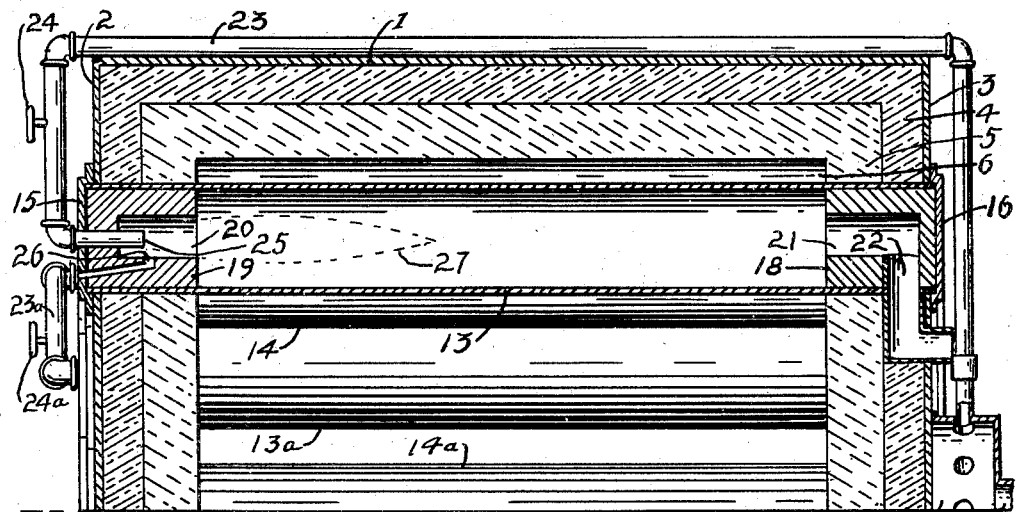
FIGURE 5
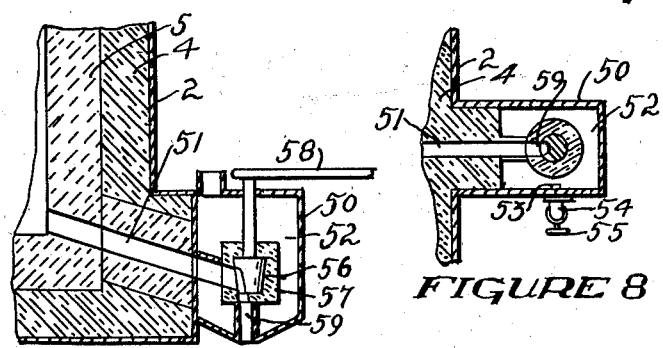
FIGURE 7
FIGURE 8
INVENTOR
Henry M. Griffoul
BY
John A. Chainsmith
ATT'Y Patented June 24, 1947

2,423,018

UNITED STATES PATENT OFFICE 2,423,018

ROTARY DRUM FURNACE

Henry M. Griffoul, San Jose, Calif.

Application October 14, 1942, Serial No. 462,045

1 Claim. (Cl. 263—32)

The present invention relates particularly to that type of furnaces designed for the melting of metals for the forming of ingots or alloys, and more particularly to a furnace for melting or refining non-ferrous metals of the type that oxidize rapidly when exposed to the air.

It is one object of my invention to provide a furnace of the character indicated whereby metals of the type indicated may be mixed or purified with the minimum use of flux.

It is another object to provide a furnace so constructed and arranged that metals of widely varying specific gravity may be thoroughly mixed to form a homogeneous alloy.

It is still another object of the invention to provide a furnace of the character indicated whereby the metal may be melted by the application of heat throughout its entire mass, and wherein the metallic mass is kept in motion during the melting process and the melting thereby speeded up.

Finally, it is an object of the invention to provide a furnace of the character indicated wherein the air in the furnace may be replaced with inert gas during the melting process; wherein a rotary or rocking movement may be imparted to the melting pot; that will be economical to manufacture, quickly and easily charged and emptied, easily repaired and highly efficient in its practical application.

In the drawing:

Figure 5 is a sectional view on line 5—5, Figure 4.

Figure 6 is a sectional view on line 6—6, Figure 4.

Figure 7 is a detail section on line 7—7, Figure 1.

Figure 8 is a detail section on line 8—8, Figure 1.

Figure 1:
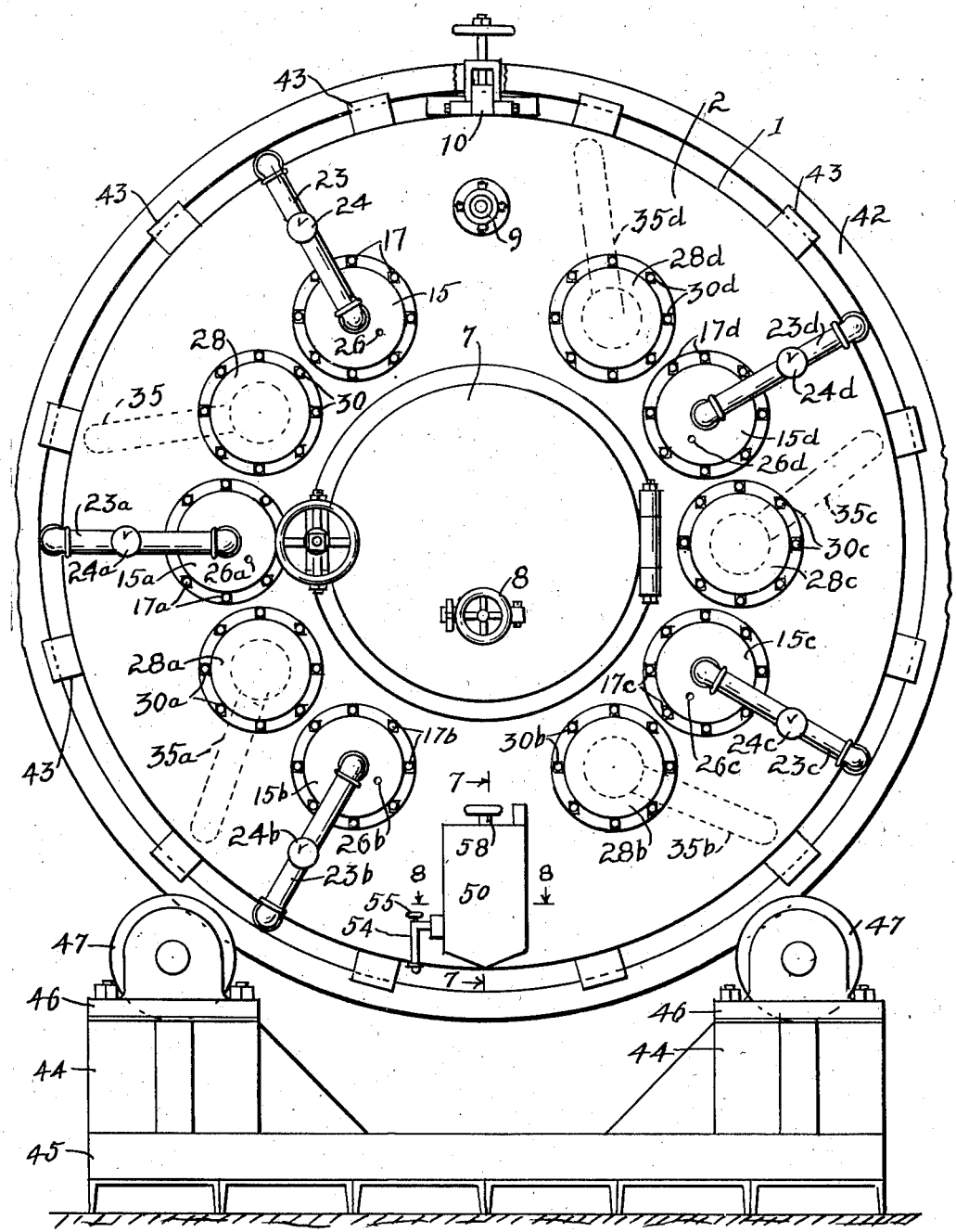
Figure 1 is a front end elevation of a furnace embodying my invention, parts being broken away.
Figure 2:
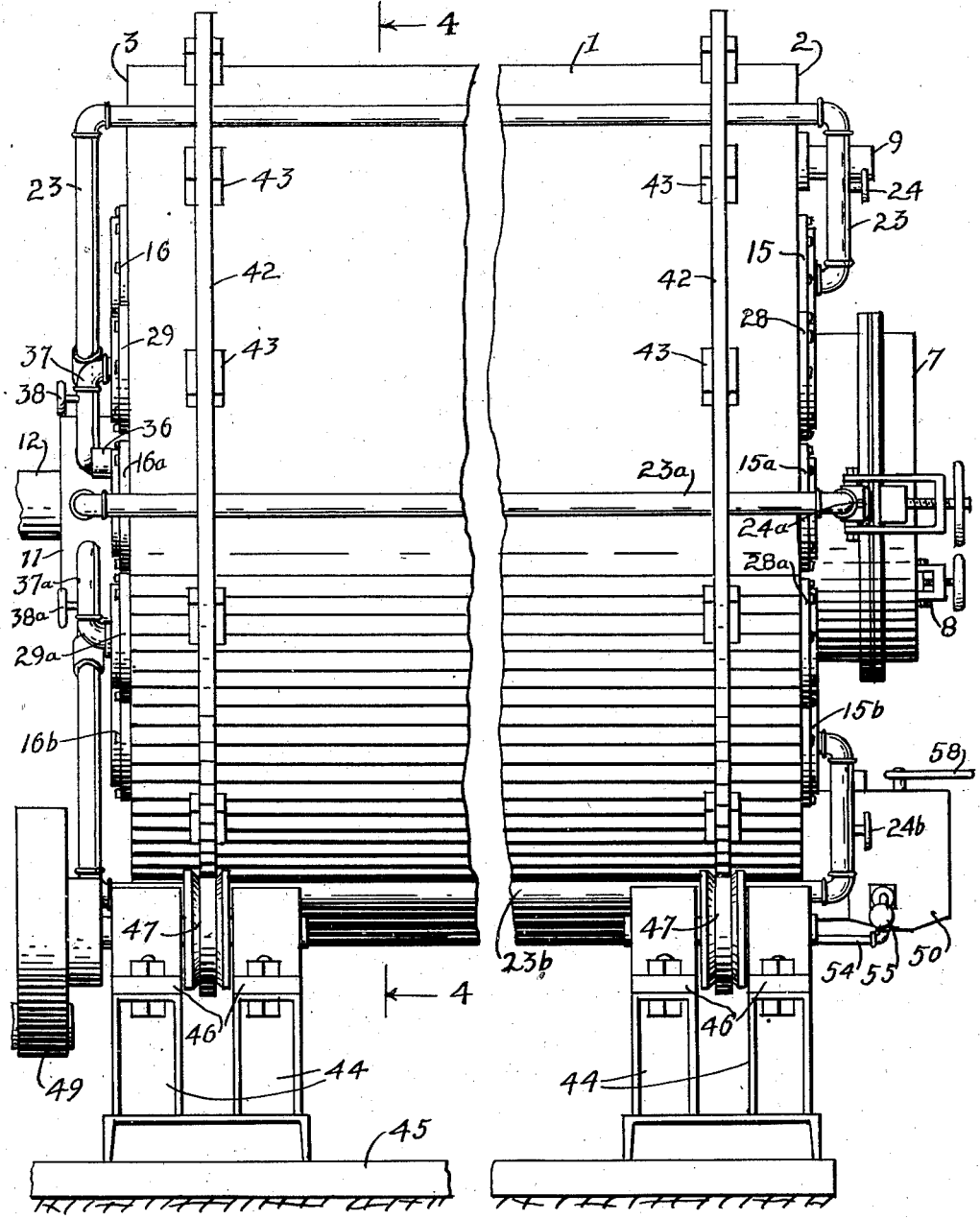
Figure 2 is a side elevation of the same.
Figure 3:
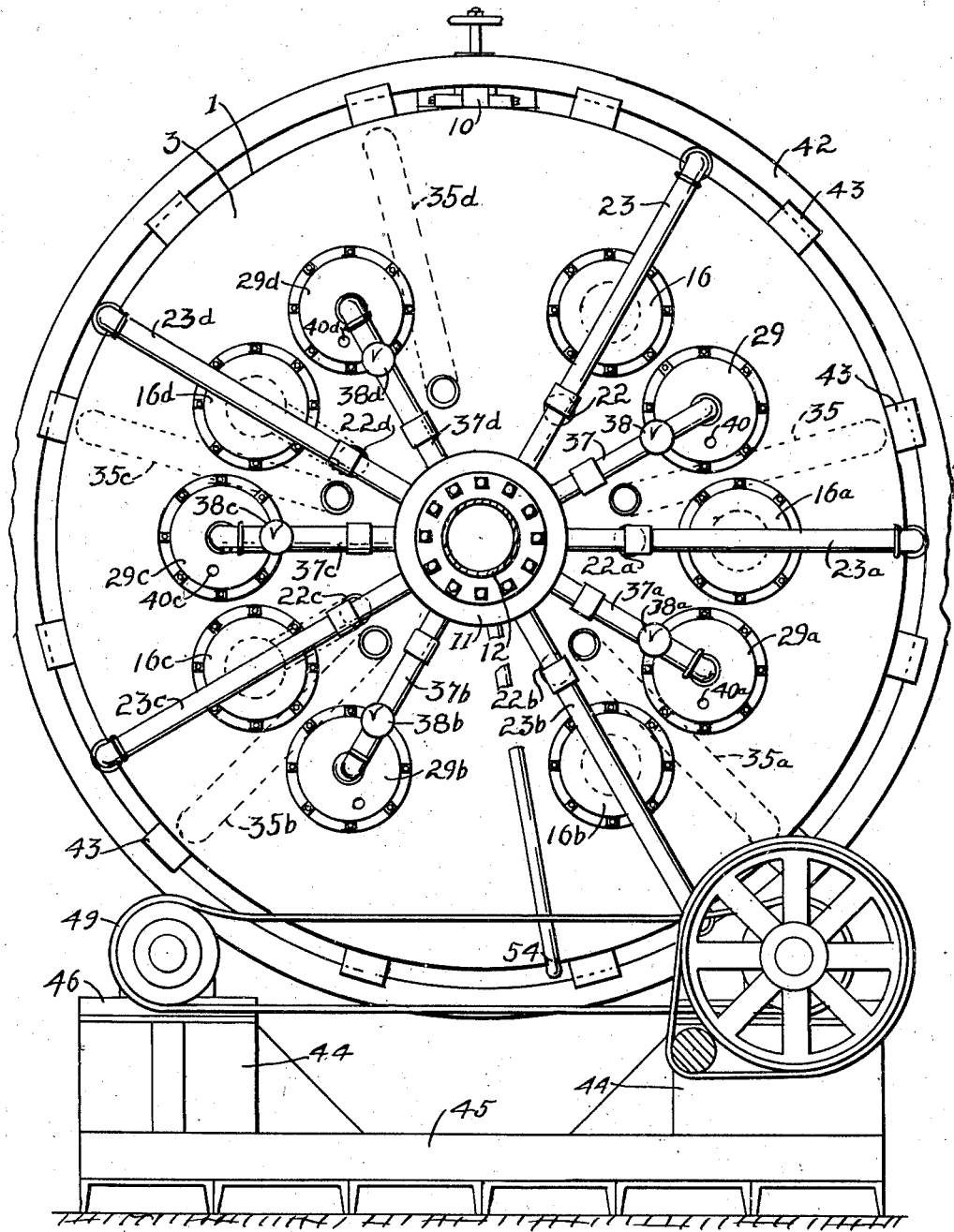
Figure 3 is a rear end elevation of the same with parts broken away.
Figure 4:
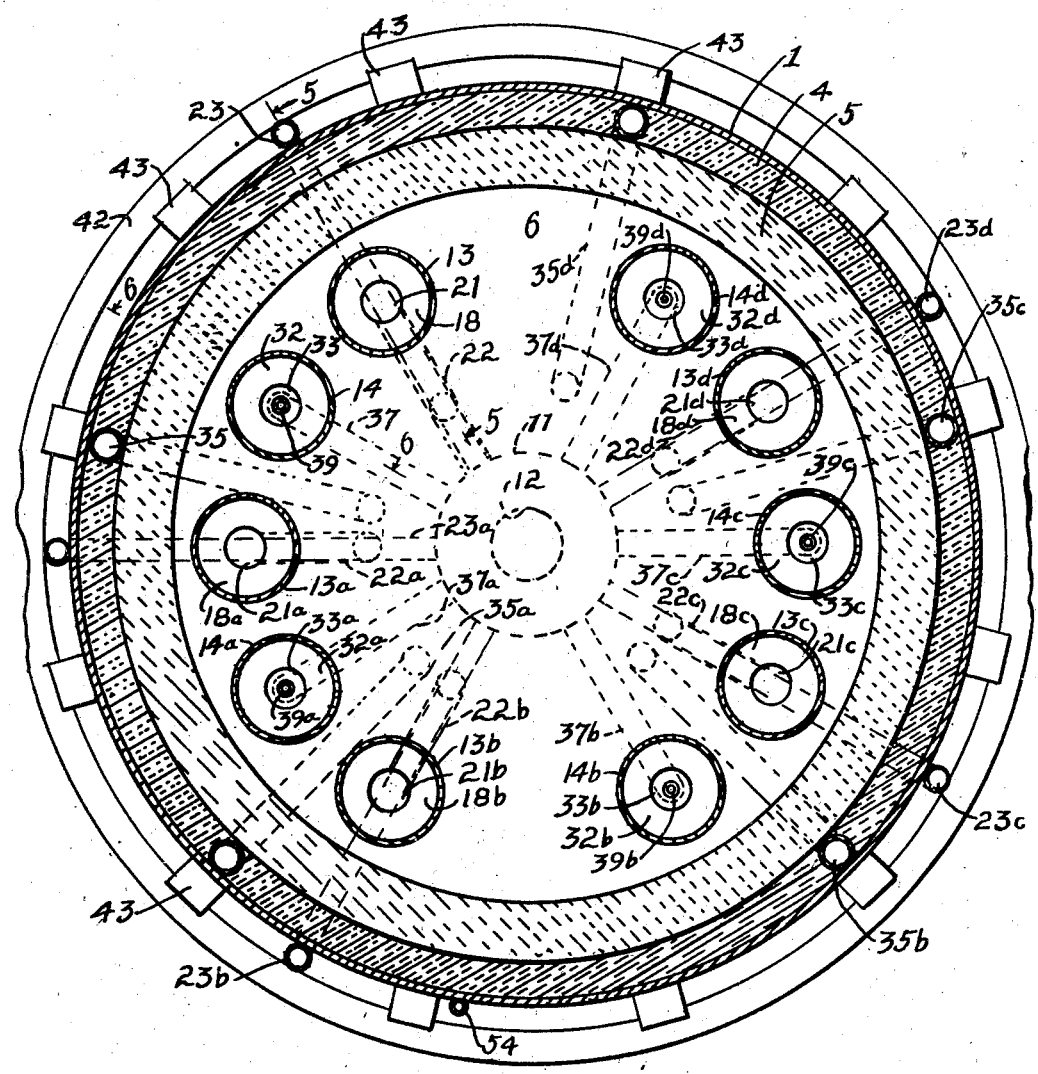
Figure 4 is a sectional view on line 4—4, Figure 2.

Referring now more particularly to the drawing, I show at 1 a tubular shell with front and rear end closures 2 and 3 and lined throughout with a double lining, that portion of the lining lying next to the metallic shell being of suitable heat insulating material at 4, and the inner portion of the lining consisting of suitable refractory material such as carbon blocks, as at 5.

The shell and its lining, above described, encloses a chamber 6 and has a door 7 mounted in the center of its front end 2 and through which material to be melted is inserted into the chamber. The temperature in the chamber 6 is gauged by a thermostat at 8, a drain communicates with the chamber 6 through the front 2 as at 9, and a clean-out for the chamber 6 is provided at 10.

Mounted upon the outside of the rear end 3 of the shell 1 and in concentric relation to its axis, is a manifold 11 supplied with a combustible gaseous mixture through a pipe 12 from a source of supply not shown.

The heating of the chamber 6 is accomplished in the following manner, but since there are two sets of heating elements and the elements of each set are identical, only one element of each set will be described in detail, the corresponding parts of the other elements being indicated by similar numerals having appropriate letters associated therewith.

In the present disclosure I have shown each set of heating elements as consisting of five tubes as 13, 13a, 13b, 13c, 13d and 14, 14a, 14b, 14c, 14d alternating in a circle concentric with the chamber 6 as shown.

The tube 13 extends lengthwise of the chamber 6 in parallel relation to its axis, and extends through the lining 4—5 and through the shell end walls at 2 and 3 as shown in Figure 5 in close relationship to its wall 5. Each end of the tube 13 is capped by a member 15—16 which is bolted to the shell as at 17. In each end of the tube 13 is fitted a carbon block as at 18 and 19, each block having a length equal to the thickness of the lining 4—5 and having a recess as 20 and 21 formed therein and axially thereof, and in open communication with the tube as shown. Communicating with the recess 21 is a tubular passage 22 which extends laterally through the lining 4 and radially of the shell, and thence outwardly to discharge into the atmosphere. This passage 22 forms an exhaust passage for the burned gases in tube 13.

Projecting axially through cap 15 and the end of block 18 into recess 20 is a fuel supply pipe 23 which is carried around the shell 1 to the manifold 11 and is fitted with a control valve at 24. The gaseous fuel discharged from the burner at 25 is ignited by an electric spark at 26 and projected into the tube as indicated at 27.

The tube 14, lying next to tube 13 and spaced a little way therefrom, is disposed in parallel relation with the tube 13, and likewise is capped with members 28 and 29 which are in turn bolted to the shell as at 30. In each end of tube 14 is fitted a block of refractory material such as carbon and as shown at 31—32 and provided with recesses as 33—34 communicating with the interior of the tube.

Communicating with the recess 34 is a tubular passage 35 which extends through the lining portion 4 around to the rear side 3 where it discharges into the atmosphere as indicated at 36 and forms an outlet for the burned gases from the tube 14.

Projecting axially through the cap member 29 and into the recess 33 is a fuel supply pipe 37 which is connected to the manifold 11 and provided with a control valve 38. The gaseous fuel discharged from the burner 39 is ignited by an electric spark at 40 and projected into the tube 14 as indicated at 41.

Fixedly mounted on the peripheral surface of the shell 1, and spaced a little therefrom, are annular rails as 42. These rails 42 are concentric with the axis of the shell and are supported on shoes 43 which are in turn mounted on the shell 1. At 44 are shown standards mounted on a suitable base 45, and at 46 are shown bearings mounted on the standards 44. In the bearings 46 are journalled roller wheels as 47 in which the rails 42 are seated. The wheels 47 are rotated by means of a motor 48 and a belt drive therefrom as 49.

Assuming that the furnace has been properly cleaned through the clean-out 10, a charge of metal to be melted is inserted through the door 7. If this metal is magnesium the air may be exhausted from chamber 6 through the thermostat door 8 and an inert gas inserted to take its place. The gas may be admitted and lighted in the several tubes, the exhaust from all of the tubes being discharged in the rear as described, and as the temperature in the chamber 6 reaches the proper point the metal is thrown into violent agitation by imparting a rotating or rocking movement to the shell 1 and the parts mounted thereon.

The tubes 13—14 to 13d—14d are heated until they glow a dull red, and as the cylindrical structure rotates the metal therein is thoroughly stirred and mixed by the tubes passing through it, this constant stirring and mixing also aiding materially in its fusing, without the use of any material amount of flux.

When magnesium, in particular, is melted in a crucible a great deal of heat is lost because that portion of the metal in the bottom of the crucible must be greatly over heated in order to raise the temperature of the top portion to the required point for fusion, and oxidation must be prevented by the formation of a crust over the top of the melting metal. With my invention there is no heat loss because the metal is kept in constant motion and all of it is caused to contact the tubes, consequently the temperature is maintained uniform throughout the whole body of metal.

Another important feature of my invention is that in making alloys, where there is a great difference in the specific gravity of the metals used, a perfect mixture of the metals can be obtained and a homogeneous mass with a uniform grain achieved.

When the metal is completely fused and ready for pouring this step is taken by means of a pouring valve as indicated generally at 50. The pouring valve 50 communicates with a passage 51 passing through the front end 2 of the furnace, and comprises a heating chamber 52 heated by means of a gas inlet 53 connected to the manifold 11 by a pipe 54 and controlled by a valve 55. The plug 56 is in an insulated housing 57 and operated by handle 58 so that the molten metal flowing through 59 can be kept at the same temperature until it reaches the ingot molds.

By being able to pour the metal, that is the molten magnesium, into the ingot molds at the temperature in chamber 6, dusting of the poured metal is eliminated.

By means of the structure disclosed, the furnace may be kept in operation continually, because the tubes 13—14 are the only parts that are subjected to excessive temperatures and wear, and these can be removed and replaced with new tubes when required in a few minutes time. Also, the magnesium may be melted in this furnace with greater safety than in the ordinary crucible, and with a minimum percentage of flux and melting loss.

Having thus described my invention, what I claim as new and desire to secure by Letters Patent, is:

A furnace of the character described comprising, a hollow cylindrical drum having rails mounted upon and encompassing its peripheral surface, fixedly positioned roller elements disposed to receive said rails and support said drum, driving means for the roller elements, heating tubes disposed within the drum in parallel relationship with its axis and concentrically disposed relative thereto, said tubes being disposed adjacent the inner periphery of the drum, and extending through the ends thereof, cap members closing the ends of the tubes, a fuel discharge nozzle disposed in the alternate ends of successive tubes, a manifold disposed on one end of the drum, fuel conducting pipes connecting the manifold with each nozzle, and tube means for discharging the burnt gases from the several heating tubes disposed within the drum wall and directly connected to said heating tubes at the ends remote from the nozzles and discharging at points adjacent said manifold.

HENRY M. GRIFFOUL.

REFERENCES CITED

The following references are of record in the file of this patent:

UNITED STATES PATENTS

| Number | Name | Date |
|---|---|---|
| 1,665,546 | Hatch | Apr. 10, 1928 |
| 2,046,419 | Tourville | July 7, 1936 |
| 2,219,894 | Hamlink | Oct. 29, 1940 |
| 2,051,099 | Munford | Aug. 18, 1936 |
| 2,047,471 | Hepburn | July 14, 1936 |
| 2,084,713 | Thayer | Jan. 22, 1937 |
| 2,309,810 | West | Feb. 2, 1943 |
| 2,276,971 | Hoak | Mar. 17, 1942 |
| 2,231,956 | Schwier | Feb. 18, 1941 |
| 2,086,971 | Wilson | July 13, 1937 |
| 2,137,040 | Woodson | Nov. 15, 1938 |

FOREIGN PATENTS

| Number | Country | Date |
|---|---|---|
| 387,060 | Great Britain | Feb. 2, 1933 |